(12) United States Patent
Patro

(10) Patent No.: US 7,873,152 B1
(45) Date of Patent: Jan. 18, 2011

(54) SYSTEM, METHOD, AND COMPUTER PROGRAM PRODUCT FOR RATING BASED ON A RECEIVER OFFER

(75) Inventor: Debabrata Patro, Pune (IN)

(73) Assignee: Amdocs Software Systems Limited, Dublin (IE)

( * ) Notice: Subject to any disclaimer, the term of this patent is extended or adjusted under 35 U.S.C. 154(b) by 1261 days.

(21) Appl. No.: 11/212,086

(22) Filed: Aug. 24, 2005

(51) Int. Cl.
*H04M 15/00* (2006.01)
*H04M 11/00* (2006.01)

(52) U.S. Cl. ............................ 379/121.02; 379/114.06; 379/114.2; 455/406

(58) Field of Classification Search ............ 379/114.01, 379/114.06, 114.2, 114.21–114.23, 121.02, 379/121.04, 126, 127.06; 455/405–408
See application file for complete search history.

(56) References Cited

U.S. PATENT DOCUMENTS

| | | | | |
|---|---|---|---|---|
| 5,381,467 A | * | 1/1995 | Rosinski et al. | 379/121.01 |
| 7,391,855 B2 | * | 6/2008 | Winstead et al. | 379/114.21 |
| 2003/0032405 A1 | * | 2/2003 | Rhodes | 455/406 |
| 2004/0029561 A1 | * | 2/2004 | Holter et al. | 455/405 |
| 2004/0190696 A1 | | 9/2004 | Fleischer, III et al. | 379/114.01 |

FOREIGN PATENT DOCUMENTS

WO  WO 2004/014045  2/2004

* cited by examiner

*Primary Examiner*—Quoc D Tran
(74) *Attorney, Agent, or Firm*—Zilka-Kotab, PC

(57) ABSTRACT

A rating system, method, and computer program product are provided. In use, a phone call is identified between a caller and a receiver. An offer associated with the receiver is then determined. Thus, the phone call is rated based, at least in part, on the offer associated with the receiver.

24 Claims, 4 Drawing Sheets

ND COMPUTER
SYSTEM, METHOD, AND COMPUTER PROGRAM PRODUCT FOR RATING BASED ON A RECEIVER OFFER

FIELD OF THE INVENTION

The present invention relates to billing systems, and more particularly to billing for phone calls.

BACKGROUND

Currently, a calling party's (i.e. caller's) offer governs the rating of an outgoing call. In other words, a telecommunication service provider provides the caller with an offer that dictates the terms of the service. Thereafter, when the caller places a call to a receiving party (i.e. receiver), such offer dictates the rating terms associated with the call. Unfortunately, this type of rating results in an inflexible system.

Some prior art system do, however, incorporate, to some degree, information associated with a receiver, when rating a call. For example, some prepaid systems provide a rating based on a brand associated with a receiver's service provider. This is accomplished by providing separate Mobile Station International ISDN Number (MSISDN) ranges for each brand of subscribers and handling one brand of subscribers with a specific rating engine.

To this end, rating alterations (e.g. discounts, etc.) may be afforded based on whether the service provider brand of the caller and receiver are the same. For example, if a caller using service provider brand "X" calls a receiver with using service provider brand "Y," the caller will pay a higher tariff compared to calling a receiver using service provider brand "X." Again, this type of rating is still quite limited, in that it is limited to merely the service provider brand of the caller and receiver.

There is thus a need for overcoming these and/or other problems associated with the prior art.

SUMMARY

A rating system, method, and computer program product are provided. In use, a phone call is identified between a caller and a receiver. An offer associated with the receiver is then determined. Thus, the phone call is rated based, at least in part, on the offer associated with the receiver.

DETAILED DESCRIPTION

Figure 1:
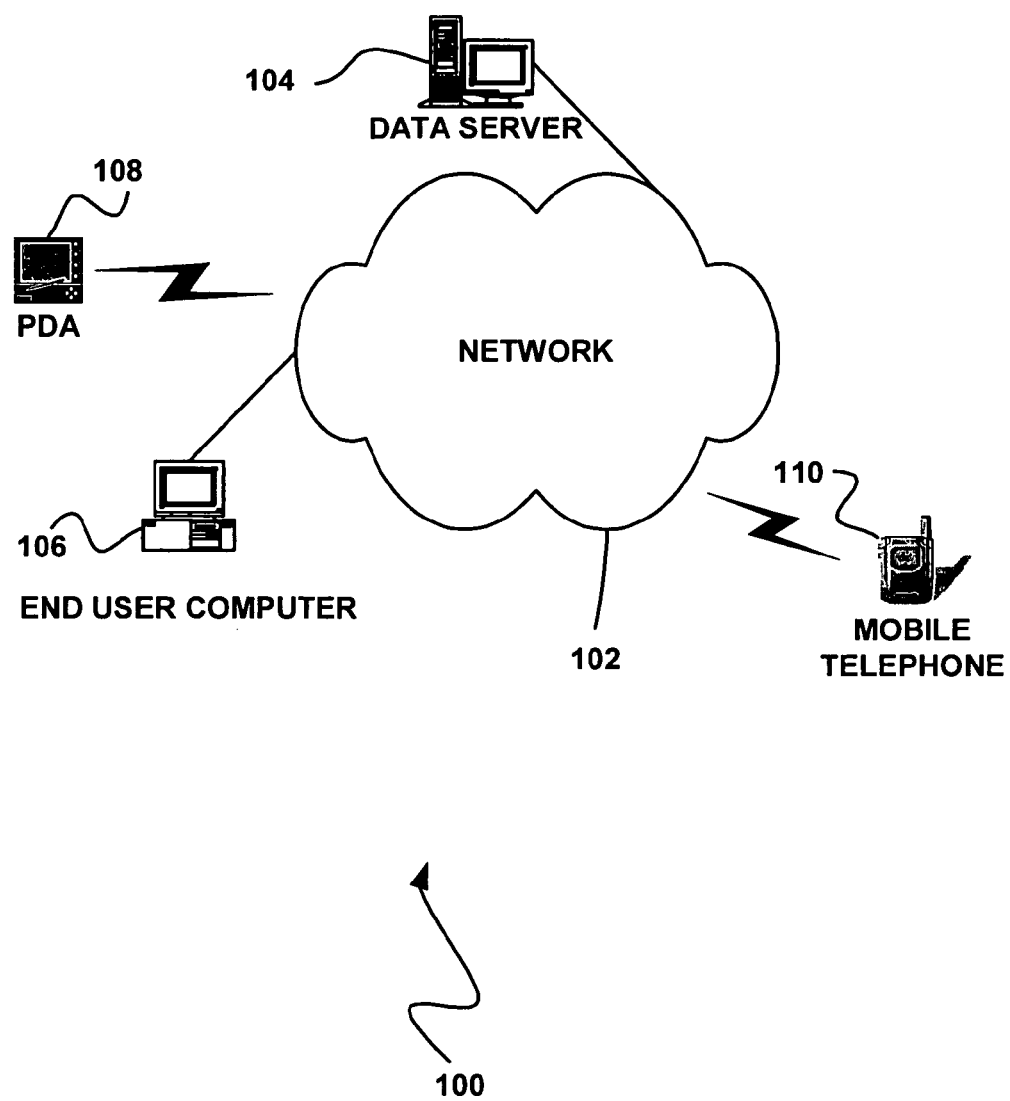
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a telecommunications network, a local area network (LAN), a wireless network, a wide area network (WAN) such as the Internet, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) 108, a mobile phone 110, etc.

It should be noted that any of the foregoing devices in the present network architecture 100, as well as any other unillustrated hardware and/or software, may be equipped with the capability of rating calls based on a receiver offer. More exemplary information regarding such architecture and associated functionality will be set forth hereinafter in greater detail.

Figure 2:
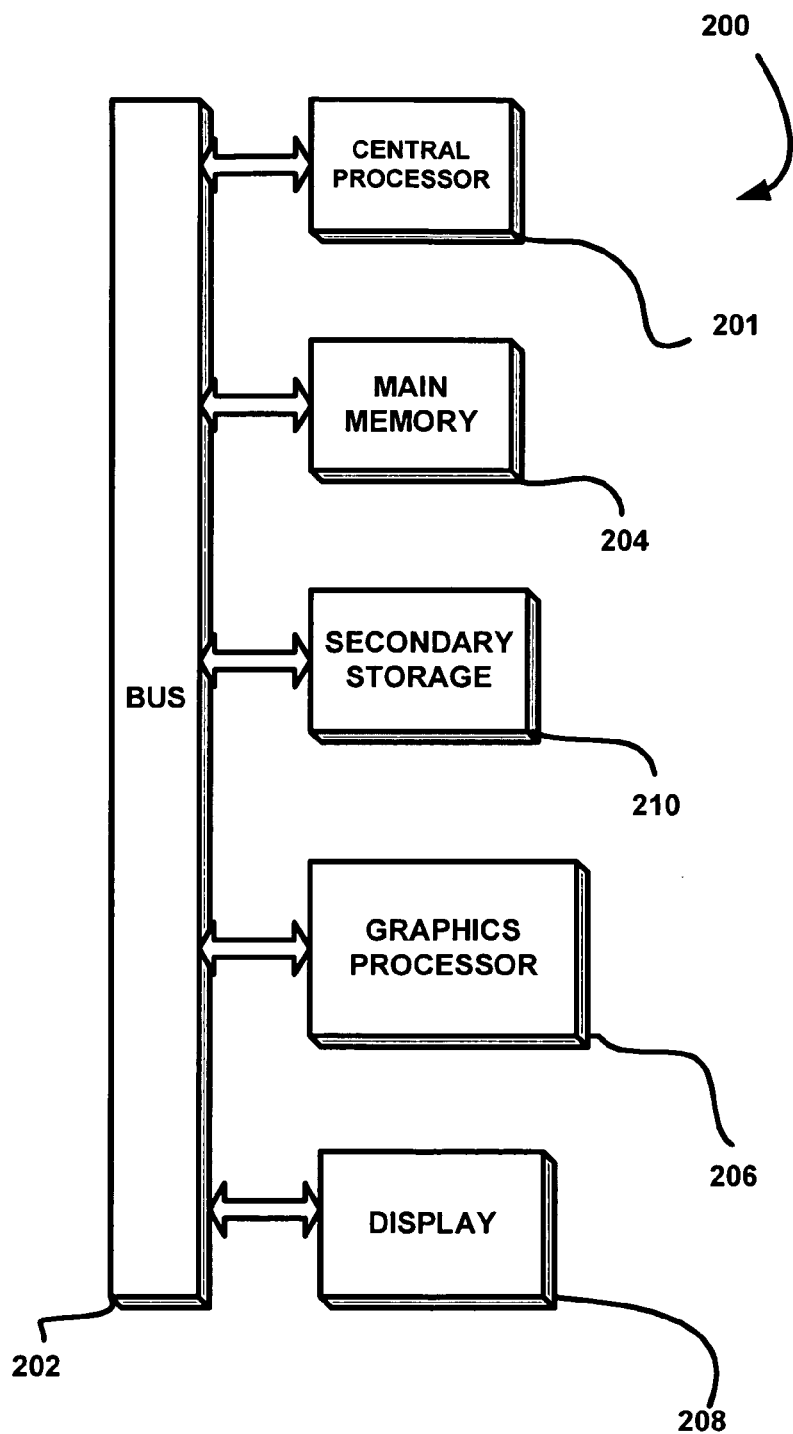
FIG. 2 shows a representative hardware environment that may be associated with the devices of FIG. 1, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes a main memory 204. Control logic (software) and data are stored in the main memory 204 which may take the form of random access memory (RAM). The computer system 200 also includes a graphics processor 206 and a display 208, i.e. a computer monitor.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media.

Figure 3:
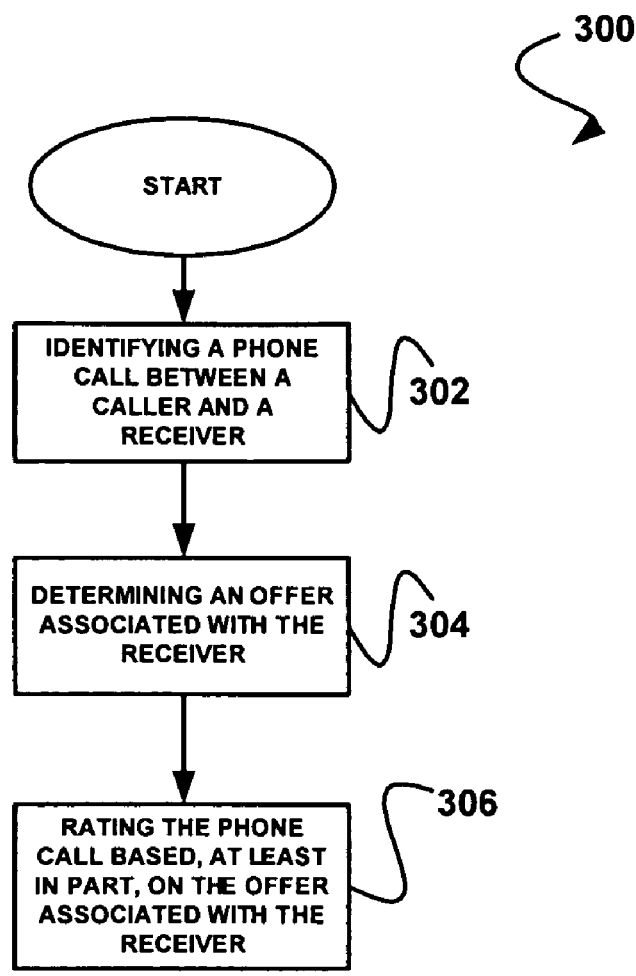
FIG. 3 shows a method for rating a phone call based on a receiver offer, in accordance with one embodiment.

FIG. 3 shows a method 300 for rating a phone call based on a receiver offer, in accordance with one embodiment. As an option, the present method 300 may be implemented in the context of the architecture and environment of FIGS. 1 and/or 2. Of course, however, the method 300 may be implemented in any desired environment.

As shown in operation 302, a phone call is identified between a caller and a receiver. The phone call may include any call capable of connecting two devices for telecommunications purposes. For example, the call may be made between a hard-line-based device and a wireless device, may be carried out over a wireless network, etc. In addition, the caller may be any person or device, capable of initiating a phone call, and the receiver may be any person or device capable of receiving the phone call. Specifically, such devices may optionally include any of the devices shown in FIG. 1.

For instance, the caller may include a first subscriber to a first phone service provider and the receiver may include a second subscriber to a second phone service provider. As an option, the caller and receiver may be subscribers to a common phone service provider. Such phone service providers may include any company or entity providing telecommunications services (e.g. Verizon® Wireless, Cingular®, etc.).

Still yet, the call can be identified in any desired manner. For example, the call may be identified in real-time by a service provider. Still yet, the call may be identified by a back-end billing system. In any case, any sort of desired data structure, signaling, etc. may be used to facilitate such identification. Of course, the call may be identified utilizing any technique capable of facilitating the rating of the call.

Next, in operation 304, an offer associated with the receiver is determined. As an option, an offer associated with the caller may also be determined. Such offer(s) may include a billing plan associated with the caller and/or receiver of the phone call. For example, the offer may be a billing plan to which the receiver of the phone call subscribes from a phone service provider. Of course, in the context of the present description, such offer may include any term(s) that affects at least one aspect of the rating of the associated party (e.g. receiver, caller, etc.).

For example, specific offers may be associated with particular types of calls. Thus, as an option, a database may be utilized for associating offers with types of calls. In this way, rating rules, discounts, etc. associated with each offer may become effective based on a type of a call. The types of calls may vary based on any aspect associated with the call, such as a phone service provider of the caller and/or receiver, a geographic location of the caller and/or receiver, a time length of the call, a time of the call, etc.

The offer of the caller and/or receiver may be determined in any desired manner. For example, the offer may be determined utilizing a database. For example, a database may be used including users (e.g. receivers, callers, etc.) with associated offers which are, in turn, associated with different types of calls.

Thus, in the present example, an offer may be determined, for example, by first identifying the users (e.g. receiver, caller, etc.) associated with a call in order to identify any corresponding offer(s). To this end, the call type information may be utilized during subsequent rating, in a manner that will soon become apparent. Additional exemplary database details will be described in more detail with respect to FIG. 4. While the foregoing exemplary offer determination technique has been set forth, it should be noted that any determination may be utilized which is capable of identifying an offer associated with a receiver, caller, etc.

As an option, the results of operation 304 may be consolidated into a single record. Thus, the phone call may be conveniently rated based, at least in part, on the offer associated with the receiver, as shown in operation 306. Again, in the context of the foregoing example involving the database (where an offer of a caller is also determined), various characteristics associated with the type of the call may be compared against the aforementioned single record to determine whether any of the relevant offers apply. If any such offers apply, the rating may be carried out in accordance with the offer. Again, while the foregoing rating technique is set forth, it should be noted that absolutely any desired rating may be utilized which is at least partly a function of the offer associated with the receiver.

In this way, a caller of a phone call may be fully or partially charged for the call and/or a receiver of a phone call may be fully or partially charged for the call. In addition, the charges may be applied to the caller and/or receiver based on offers associated solely with the receiver or solely with the caller. As another option, the caller and/or receiver may be charged for the call based on a combination of offers associated with the caller and receiver.

As just one example, the rating may be altered if the offer associated with the receiver is the same (or includes at least one common aspect) as the offer associated with the caller. This type of rating scheme may, for example, encourage related subscribers to utilize a similar offer, etc. Of course, other types of marketing goals may also be enabled by the present framework, such as encouraging subscribers to consolidate offers, acquiring new subscribers, etc.

Table 1 illustrates various scenarios whereby the offers of the caller and/or receiver, as well as the type of call, may drive an associated rating/charging impact.

TABLE 1

| Receiver's Offer | Caller's Offer | Type of Call | Rating/Charging Impact |
| --- | --- | --- | --- |
| Offer 11 | Any | Voice-Local | 10% discount on standard price |
| Offer 12 | Any | Voice-Local | Charge to Receiver, Free for caller |
| Offer 21 | Offer 21 | Voice | 25% discount on standard price |
| Offer 21 | Offer 21 | SMS | 50% discount on standard price |

In various embodiments, the foregoing rating may optionally be performed by a post-paid billing system or a pre-paid billing system (in real-time). For example, in post paid billing systems, the rating may provide a price to be billed (by mail, etc.) to the caller and/or receiver for the phone call. In pre-paid billing systems, the rating may involve subtracting from an amount which is allotted to the subscriber. Thus, a price of the phone call may be subtracted from the caller's and/or receiver's pre-paid account. In addition, the rating may be based on a per-minute basis, a one-time basis, etc.

Furthermore, a subscriber of a phone service provider may change offers without changing an Mobile Station International ISDN Number (MSISDN) associated with the subscriber. This may be accomplished by associating the offers with the subscribers, in the foregoing manner. In this way, phone service providers may provide new offers according to marketing needs without having to change rating systems on their networks to support different rating systems associated with the new offers.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
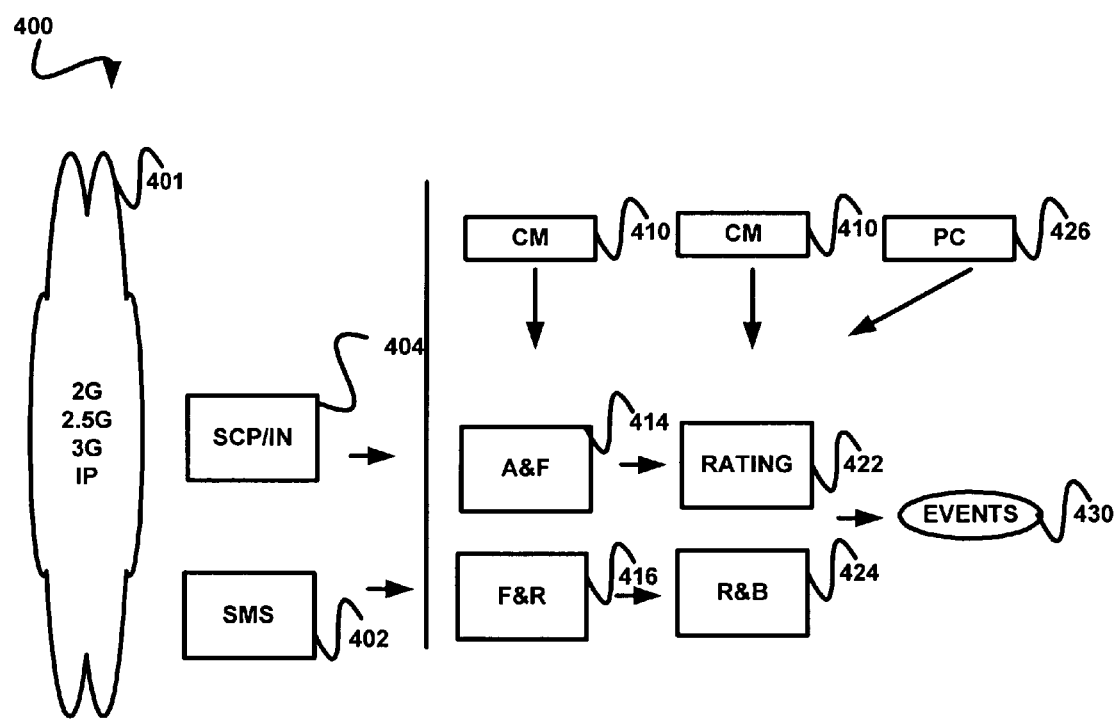
FIG. 4 shows a system for rating a phone call based on a receiver offer, in accordance with one embodiment.

FIG. 4 shows a system 400 for rating a phone call based on a receiver offer, in accordance with one embodiment. As an option, the present system 400 may be implemented in the context of the architecture and environment of FIGS. 1-3 (including the definitions provided in the description of FIG. 3). Of course, however, the system 400 may be implemented in any desired environment.

As shown, at least one customer management (CM) application 410 is included. The CM application 410 may include a master repository of offers associated with subscribers of at least one phone service provider. The offers may be further described in a product catalog (PC) component 426. For instance, details of the offers, such as specific time periods the offer is available, the requirements for the offer to be valid, etc. may be included in the PC component 426.

Furthermore, an offer that is associated with a subscriber may allow for information associated with the offer to be published by the CM application 410. In addition, the information associated with the offer may also be updated by an acquisition and formatting (AF) application 414 and a formatting and routing (FR) application 416, such that if any information associated with the offer changes, the PC component 426 may be updated. The AF application 414 and/or the FR application 416 may be any applications capable of acquiring updates and sending the updates to the CM application 410 and/or the PC component 426.

Information associated with offers specific to each subscriber may also be published by the CM application 410 and may be updated by a rating and balance management (RB) subsystem 424 and a rating subsystem 422. Again, the RB subsystem 424 and the rating subsystem 422 may include any system capable of receiving information associated with offers and updating the CM 410 application and/or the PC component 426 with the information.

When any subscriber of a phone service provider ("A") makes a call to another subscriber of a phone service provider ("B"), the call may arrive at the AF application 414 in a call details record (CDR) file. As another option, the call may arrive as a real-time event from a service call provider/intelligent network 404 or a short service messaging (SMS) center 402 to the FR application 416. The AF application 414 and/or the FR application 416 analyzes the associated input file (CDR) and/or the event details. Thus, both the "A" and "B" party offers may be identified. While a few events have been disclosed, it should be noted any event originating from a network 401 may be received in any desired format.

Since the AF application 414 and the FR application 416 contain updated information about the offers associated with each subscriber, the identified offers include offers that are current. After the information about the offer(s) is identified, the input file and/or event details associated with the call may be updated with the information about the offers. The updated input file and/or event details may then be sent to the Rating subsystem 422 and/or the RB subsystem 424 for rating purposes.

Since the rating subsystem 422 and/or the RB subsystem 424 each have access to information associated with offers along with information about the associated subscribers, the rating subsystem 422 and/or the RB subsystem 424 is capable of rating the call based on the "A" party's offer and/or the "B" party's offer. As an option, rating according to the "B" party offer may be made for post-paid subscribers, such as by using the AF application 414 and the rating subsystem 422. As another option, rating according to the "B" party offer may be made for pre-paid subscribers, such as by using the FR application 416 and the RB subsystem 424.

Again, in this way, any call charges may be applied to the caller and/or receiver based on offers associated solely with the receiver or solely with the caller. Furthermore, the caller and/or receiver may be charged for the call based on a combination of offers associated with the caller and receiver. To this end, rated events 430 are output.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A rating method, comprising:
    identifying a phone call between a caller and a receiver;
    determining a plurality of offers associated with the receiver from a database including users with associated offers, each of the associated offers further associated with a different type of call;
    determining a plurality of offers associated with the caller from the database;
    consolidating information associated with the offers associated with the receiver and the offers associated with the caller into a single record;
    comparing characteristics associated with a type of the phone call against the single record;
    determining one of the offers associated with the receiver and one of the offers associated with the caller that apply to the phone call, based on the comparison; and
    rating the phone call based, at least in part, on a combination of the one of the offers associated with the receiver, and the one of the offers associated with the caller;
    wherein the rating is altered if the offer associated with the receiver is the same as the offer associated with the caller.

2. A rating method as recited in claim 1, wherein the offer includes a billing plan.

3. A rating method as recited in claim 2, wherein the billing plan includes discounts based on a type of the call.

4. A rating method as recited in claim 2, wherein the billing plan includes at least one rating rule based on a type of the call.

5. A rating method as recited in claim 2, wherein the billing plan includes at least one rating rule based on a time of the call.

6. A rating method as recited in claim 1, wherein the rating is performed by a post-paid billing system.

7. A rating method as recited in claim 6, wherein the rating provides a price charged to at least one of the caller and receiver for the phone call.

8. A rating method as recited in claim 1, wherein the rating is performed by a pre-paid billing system.

9. A rating method as recited in claim 8, wherein the rating subtracts a price from an account of at least one of the caller and receiver.

10. A rating method as recited in claim 1, wherein the rating includes determining if the offer associated with the receiver indicates that the receiver is to be at least partially charged for the call.

11. A rating method as recited in claim 10, and further comprising at least partially charging the receiver if it is determined that the offer associated with the receiver indicates that the receiver is to be at least partially charged for the call.

12. A rating method as recited in claim 1, wherein the offer associated with the receiver is updated.

13. A rating method as recited in claim 1, wherein the rating occurs in real-time.

14. A rating method as recited in claim 1, wherein the phone call is carried out over a wireless network.

15. A computer program product embodied on a non-transitory computer readable medium, comprising:
    computer code for identifying a phone call between a caller and a receiver;
    computer code for determining a plurality of offers associated with the receiver from a database including users with associated offers, each of the associated offers further associated with a different type of call;
    computer code for determining a plurality of offers associated with the caller from the database;
    computer code for consolidating information associated with the offers associated with the receiver and the offers associated with the caller into a single record;

computer code for comparing characteristics associated with a type of the phone call against the single record;

computer code for determining one of the offers associated with the receiver and one of the offers associated with the caller that apply to the phone call, based on the comparison; and computer code for rating the phone call based, at least in part, on a combination of the one of the offers associated with the receiver, and the one of the offers associated with the caller;

wherein the computer program product is operable such that the rating is altered if the offer associated with the receiver is the same as the offer associated with the caller.

16. A system, comprising:

logic for identifying a phone call between a caller and a receiver;

logic for determining a plurality of offers associated with the receiver from a database including users with associated offers, each of the associated offers further associated with a different type of call;

logic for determining a plurality of offers associated with the caller from the database;

logic for consolidating information associated with the offers associated with the receiver and the offers associated with the caller into a single record;

logic for comparing characteristics associated with a type of the phone call against the single record;

logic for determining one of the offers associated with the receiver and one of the offers associated with the caller that apply to the phone call, based on the comparison; and logic for rating the phone call based, at least in part, on a combination of the one of the offers associated with the receiver, and the one of the offers associated with the caller;

wherein the system is operable such that the rating is altered if the offer associated with the receiver is the same as the offer associated with the caller.

17. A rating method as recited in claim 1, wherein the rating is altered by applying a discount to the rating for encouraging the caller and the receiver to utilize the same offer.

18. A rating method as recited in claim 1, wherein the rating is altered based on the type of the phone call.

19. A rating method as recited in claim 1, wherein the different types of call each associated with one of the offers varies based on a phone service provider of the caller and the receiver.

20. A rating method as recited in claim 1, wherein the different types of call each associated with one of the offers varies based on a geographic location of the caller and the receiver.

21. A rating method as recited in claim 1, wherein the different types of call each associated with one of the offers varies based on a time length of the call.

22. A rating method as recited in claim 1, wherein the different types of call each associated with one of the offers varies based on a time of the call.

23. A rating method as recited in claim 1, wherein the rating is altered if the offer associated with the receiver is the same as the offer associated with the caller such that the caller and the receiver are encouraged to utilize a same offer for the phone call.

24. A rating method as recited in claim 1, wherein a predetermined rating rule is associated with the combination of the one of the offers associated with the receiver and the one of the offers associated with the caller, and the phone call is rated utilizing the predetermined rule.

* * * * *